US010472594B2

(12) United States Patent
Jiang et al.

(10) Patent No.: US 10,472,594 B2
(45) Date of Patent: Nov. 12, 2019

(54) SULFONATED COPOLYMERS FOR DETERGENT COMPOSITION

(71) Applicant: Itaconix Corporation, Stratham, NH (US)

(72) Inventors: Bo Jiang, Newmarket, NH (US); Yvon Durant, Lee, NH (US); John Shaw, Hampton Falls, NH (US)

(73) Assignee: Itaconix Corporation, Stratham, NH (US)

( * ) Notice: Subject to any disclaimer, the term of this patent is extended or adjusted under 35 U.S.C. 154(b) by 81 days.

(21) Appl. No.: 15/484,829

(22) Filed: Apr. 11, 2017

(65) Prior Publication Data

US 2018/0291312 A1 Oct. 11, 2018

(51) Int. Cl.

| | | |
|---|---|---|
| *C11D 1/66* | (2006.01) | |
| *C11D 3/386* | (2006.01) | |
| *C11D 3/395* | (2006.01) | |
| *C11D 3/37* | (2006.01) | |
| *C08F 222/02* | (2006.01) | |
| *C08L 35/00* | (2006.01) | |
| *C08L 33/26* | (2006.01) | |
| *C11D 17/04* | (2006.01) | |
| *C11D 11/00* | (2006.01) | |

(52) U.S. Cl.
CPC ............ *C11D 3/378* (2013.01); *C08F 222/02* (2013.01); *C08L 33/26* (2013.01); *C08L 35/00* (2013.01); *C11D 3/3953* (2013.01); *C08L 2205/025* (2013.01); *C11D 11/0023* (2013.01); *C11D 17/042* (2013.01)

(58) Field of Classification Search
CPC ........... C11D 1/66; C11D 3/044; C11D 3/378; C11D 3/386; C11D 3/395; C11D 17/0073; C11D 17/042
See application file for complete search history.

(56) References Cited

U.S. PATENT DOCUMENTS

| | | | |
|---|---|---|---|
| 4,711,725 A | 12/1987 | Amick et al. | |
| 4,721,576 A | 1/1988 | Hale et al. | |
| 4,728,445 A | 3/1988 | Hale | |
| 5,401,807 A | 3/1995 | Hughes et al. | |
| 7,879,154 B2 | 2/2011 | Warkotsch | |
| 8,101,027 B2 | 1/2012 | Vandermeulen et al. | |
| 8,288,333 B2 | 10/2012 | Somerville Roberts | |
| 8,410,232 B2 | 4/2013 | Durant | |
| 9,115,493 B2 | 8/2015 | Rokowski et al. | |
| 9,476,011 B2 | 10/2016 | Letzelter et al. | |
| 9,487,423 B1 | 11/2016 | Durant et al. | |
| 2008/0261849 A1 | 10/2008 | Preuschen et al. | |
| 2011/0009303 A1 | 1/2011 | Tsumori et al. | |
| 2014/0018278 A1 | 1/2014 | Song et al. | |
| 2014/0053878 A1* | 2/2014 | Letzelter ................. A47L 15/44 134/25.2 | |
| 2014/0179585 A1 | 6/2014 | Souter et al. | |
| 2014/0319063 A1 | 10/2014 | Hernandez Altamirano et al. | |
| 2016/0201012 A1 | 7/2016 | Ferrieux et al. | |
| 2016/0208197 A1 | 7/2016 | Backer et al. | |

FOREIGN PATENT DOCUMENTS

| | | |
|---|---|---|
| CN | 101830571 | 9/2010 |
| EP | 3050948 | 8/2016 |
| WO | 2008017620 | 2/2008 |
| WO | 2014143773 | 9/2014 |
| WO | 2015138872 | 9/2015 |
| WO | 2016126579 A1 | 8/2016 |

OTHER PUBLICATIONS

International Search Report and Written Opinion, dated Jul. 3, 2018, in related U.S. Appl. No. PCT/US18/27012, 8 pp.
Y.G. Durant; et al., Improving the Performance and Reducing the Cost of Autodish Washer Formulations with Novel Copolymers of Itaconate Acid, 107th AOCS Annual Meeting & Expo, May 2016, p. 5, 24 pages.
Itaconix, Technical Data Sheet, Itaconix CHT 121, Better shine for non-phosphate automatic dishwashing detergents, Apr. 2017, 2 pages.
Itaconix, Itaconix Plc (ITX) Investor Presentation, Mar. 7, 2017, 26 pages.
Search report dated Jan. 4, 2019, issued in European Patent Application No. 17176686.8, 11 pages.
Search report dated Jan. 4, 2019, issued in European Patent Application No. 17176698.3, 8 pages.
Search report dated Jan. 4, 2019, issued in European Patent Application No. 17176683.5, 11 pages.

* cited by examiner

*Primary Examiner* — Brian P Mruk
(74) *Attorney, Agent, or Firm* — Grossman Tucker Perreault & Pfleger PLLC

(57) ABSTRACT

The present invention relates to a mixture of sulfonated copolymers for detergent compositions which mixture of copolymers offer chelating capability as well as the ability to remain soluble in aqueous environments.

24 Claims, No Drawings

SULFONATED COPOLYMERS FOR DETERGENT COMPOSITION

FIELD

The present invention relates to a mixture of sulfonated copolymers for detergent compositions which mixture of copolymers offer chelating capability as well as the ability to remain soluble in aqueous environments.

BACKGROUND

Inorganic sodium tripolyphosphate (STPP) has been identified as a conventional builder to extend and improve a detergent cleaner's properties. Environmental issues identified in connection with STPP have reduced or eliminated its use in detergent products, such as dishwashing detergents. Accordingly, the loss of STPP led to proposals regarding the use of other builders to provide more environmentally friendly alternatives.

The use of copolymers containing a carboxylic acid monomer and a sulfonic acid monomer have been reported. See, e.g., U.S. Pat. No. 8,288,333 directed at a process for making a detergent composition. Reference is also made to U.S. Publ. No. 2014/0319063 which is directed at a process to obtain random copolymers derived from itaconic acid and/or its isomers and sodium alkenyl sulfonates. Attention is also directed to PCT/US2015/020408 entitled "Itaconic Acid Polymers and Copolymers."

SUMMARY

A composition comprising:

(a) a first copolymer A selected from the following:

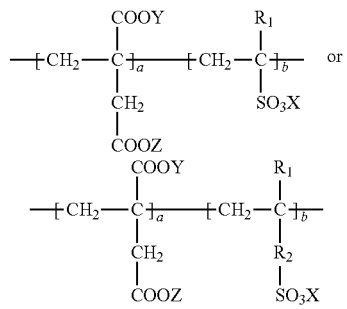

or wherein $R_1$ is a hydrogen or an alkyl group ($-CH_3$, $-CH_2CH_3$, $-CH_2CH_2CH_3$);

X, Y and Z are either hydrogen or $Na^+$, $Li^+$, $K^+$ and/or $NH_4^+$ and can be the same or different;

$R_2$ is an alkyl group ($-CH_2-$, $-CH_2CH_2-$, $-CH_2CH_2CH_2-$, $-C-(CH_3)_2$) or an aromatic group or an ester group ($-COOCH_2-$) or an amido group ($-CONH-$) to thereby provide acrylamide-alkyl sulfonic acid functionality ($-CONH-R_3-SO_3X$) where $R_3$ is an alkyl group ($-CH_2-$, $-CH_2CH_2-$, $-CH_2CH_2CH_2-$, $-C-(CH_3)_2$, $-C-(CH_3)_2-CH_2-$);

wherein the weight percent of repeat unit "a" in copolymer A is in excess to the weight percent of repeat unit "b";

(b) a second copolymer B selected from the following

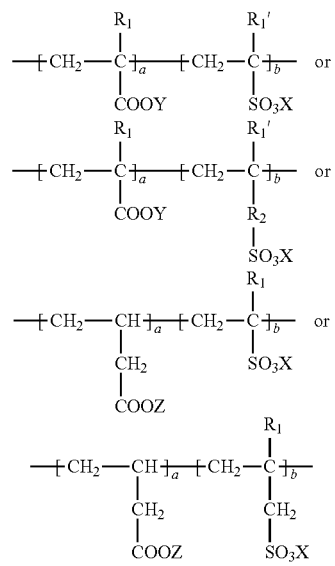

wherein $R_1$ and $R_1'$ are a hydrogen or an alkyl group ($-CH_3$, $-CH_2CH_3$, $-CH_2CH_2CH_3$) and can be the same or different;

X, Y and Z are either hydrogen or $Na^+$, $Li^+$, $K^+$ and/or $NH_4^+$ and can be the same or different;

$R_2$ is an alkyl group ($-CH_2-$, $-CH_2CH_2-$, $-CH_2CH_2CH_2-$, $-C-(CH_3)_2$) or an aromatic group or an ester group ($-COOCH_2-$) or an amido group ($-CONH-$) to thereby provide acrylamide-alkyl sulfonic acid functionality ($-CONH-R_3-SO_3X$) where $R_3$ is an alkyl group ($-CH_2-$, $-CH_2CH_2-$, $-CH_2CH_2CH_2-$, $-C-(CH_3)_2$, $-C-(CH_3)_2-CH_2-$); and wherein the weight percent of repeat unit "a" in copolymer B is in excess to the weight percent of repeat unit "b".

The present invention also relates to a dishwashing detergent formulation comprising:

(a) 2.0% by wt. to 30.0% by wt. of a first copolymer A selected from the following:

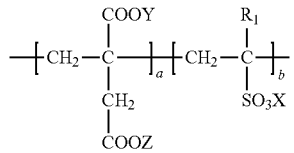

or

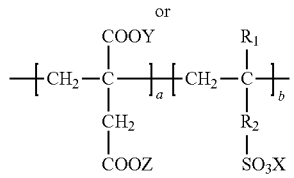

wherein $R_1$ is a hydrogen or an alkyl group ($-CH_3$, $-CH_2CH_3$, $-CH_2CH_2CH_3$);

X, Y, Z is either hydrogen or $Na^+$, $Li^+$, $K^+$ and/or $NH_4^+$ and can be the same or different;

$R_2$ is an alkyl group ($-CH_2-$, $-CH_2CH_2-$, $-CH_2CH_2CH_2-$, $-C-(CH_3)_2$) or an aromatic group or an ester group (—COOCH$_2$—) or an amido group (—CONH—) to thereby provide acrylamide-alkyl sulfonic acid functionality (—CONH—R$_3$—SO$_3$X) where R$_3$ is an alkyl group (—CH$_2$—, —CH$_2$CH$_2$—, —CH$_2$CH$_2$CH$_2$—, —C—(CH$_3$)$_2$, —C—(CH$_3$)$_2$—CH$_2$—);

wherein the weight percent of repeat unit "a" in copolymer A is in excess to the weight percent of repeat unit "b";

(b) 1.0% by wt. to 15.0% by wt. of a second copolymer B selected from the following:

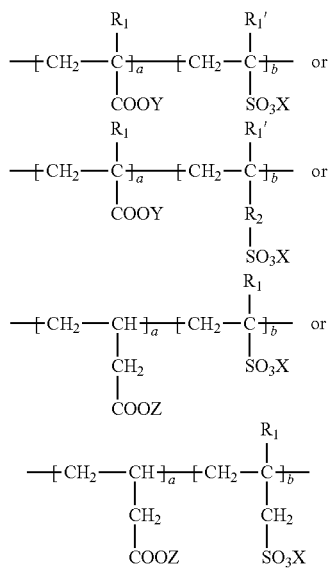

wherein R$_1$ and R$_1$' are a hydrogen or an alkyl group (—CH$_3$, —CH$_2$CH$_3$, —CH$_2$CH$_2$CH$_3$) and can be the same or different;

X, Y and Z are either hydrogen or Na$^+$, Li$^+$, K$^+$ and/or NH$_4^+$;

R$_2$ is an alkyl group (—CH$_2$—, —CH$_2$CH$_2$—, —CH$_2$CH$_2$CH$_2$—, —C—(CH$_3$)$_2$) or an aromatic group or an ester group (—COOCH$_2$—) or an amido group (—CONH—) to thereby provide acrylamide-alkyl sulfonic acid functionality (—CONH—R$_3$—SO$_3$X) where R$_3$ is an alkyl group (—CH$_2$—, —CH$_2$CH$_2$—, —CH$_2$CH$_2$CH$_2$—, —C—(CH$_3$)$_2$, —C—(—CH$_3$)$_2$—CH$_2$—);

wherein copolymer A indicates a binding capacity in the range of 350 mg CaCO$_3$/g copolymer A to 700 mg CaCO$_3$/g copolymer A and a calcium tolerance (turbidity at pH 11 minus turbidity at pH 6) of less than or equal to 100;

wherein copolymer B indicates a dispersant capacity as indicated by turbidity, as measured by titration of a solution of copolymer B in the presence of sodium carbonate with a calcium chloride solution at a concentration of 2.0 wt % at 10.0 ml per hours over 10 minutes of time at room temperature, wherein said turbidity at 400 seconds is in the range of 0-50 NTU.

DETAILED DESCRIPTION

In a first aspect, the present invention is directed at a detergent composition that provides a mixture comprising, consisting essentially of, or consisting of a first copolymer A and a second copolymer B. Copolymer A is preferably prepared by copolymerization of itaconic acid (providing two carboxylic acid groups) with a sulfonated vinyl monomer. Copolymer A also indicates a chelating ability, which is reference to the ability to bind to a metal ion by something other than a covalent bond.

Itaconic acid is reference to the formula $C_5H_6O_4$ or the formula $CH_2$=C(COOH)CH$_2$COOH. A sulfonated vinyl monomer is reference to those monomers that may copolymerize with itaconic acid and provide sulfonic acid group functionality (—SO$_3$H) suitable for chelation activity. Preferably the sulfonated vinyl monomers include the acid or alkali salt of: 2-acrylamido-2-methylpropane sulfonic acid (AMPS), vinyl sulfonic acid, vinyl aryl sulfonic acid (e.g. styrene sulfonic acid or α-methyl-styrene sulfonic acid), vinyl alkyl sulfonic acid such as allyl sulfonic acid, 3-sulfopropylmethacrylate, 3-sulfoethylmethacrylate and methallylsulfonic acid. The alkali salt may preferably include the Na$^+$, Li$^+$, K$^+$ and/or NH$_4^+$ salt of the sulfonic acid group. Accordingly, all such monomers may be copolymerized with itaconic acid or an alkali salt (such as Na+, Li+, K+, NH$_4$+) of itaconic acid and relied upon to form copolymer A herein.

In formula configuration, the monomers that may copolymerize with itaconic acid and provide sulfonic acid group functionality include:

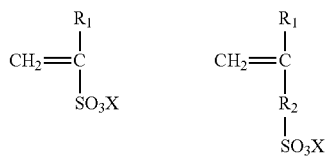

wherein R$_1$ may be hydrogen or an alkyl group (—CH$_3$, —CH$_2$CH$_3$, —CH$_2$CH$_2$CH$_3$). R$_2$ may also include an alkyl group (—CH$_2$—, —CH$_2$CH$_2$—, —CH$_2$CH$_2$CH$_2$—) or an isopropyl group such as —C—(CH$_3$)$_2$). R$_2$ may also include: (1) an aromatic group; (2) an ester group (—COOCH$_2$—) to thereby provide acrylate functionality (e.g. —COOCH$_2$SO$_3$H); or (3) an amido group (—CONH—) to thereby provide acrylamide-alkyl sulfonic acid functionality (—CONH—R$_3$—SO$_3$X) where R$_3$ may comprise an alkyl group (—CH$_2$—, —CH$_2$CH$_2$—, —CH$_2$CH$_2$CH$_2$— or an isopropyl group such as —C—(CH$_3$)$_2$, —C—(CH$_3$)$_2$—CH$_2$—). In addition, X can be either hydrogen or Na$^+$, Li$^+$, K$^+$ and/or NH$_4^+$.

Copolymer A may therefore have the following general structures:

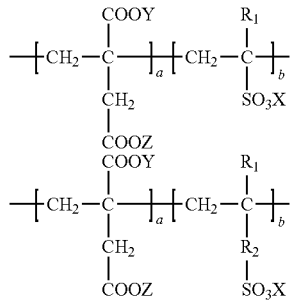

wherein R$_1$ and R$_2$, X, Y, and Z are as defined above. Copolymer A preferably has a number average MW or Mn value in the range of 1000 g/mole to 20,000 g/mole. More preferably, copolymer A has a Mn value in the range of 2,000 g/mole to 6,000 g/mole. In addition, the weight percent of repeat unit "b" in the above formula is 5.0% by weight to 40.0% by weight, more preferably 10.0% by weight to 30.0% by weight, which means that the repeat unit "a" is in an excess amount. For example, the excess amount of repeat unit "a" may preferably fall in the range of 95.0% by weight to 60.0% by weight).

In addition, it should be noted that copolymer A recited herein may optionally include one or more additionally polymerized comonomer units. Such units may include, but not be limited to polymerized vinyl comonomers, such as acrylic acid, methacrylic acid, maleic anhydride, ethylene, propylene, acrylates such as methyl acrylate or methylmethacrylate, vinyl ethers, styrene and/or α-methyl styrene. However, while there are optionally included, polymerized itaconic acid is always present, providing a vinyl monomer repeating unit with two carboxylic acid groups.

Copolymer A herein, as noted, is provided to act as a chelating agent, and as explained more fully herein, a chelating agent that remains soluble in water. Preferably, as a chelating agent, copolymer A has the ability to bind $Ca^{2+}$. Such chelating ability can be quantified by a binding capacity measurement. Specifically, binding capacity is determined by a calcium titration method while measuring turbidity. About 10.0 grams of sodium carbonate aqueous solution at 12.0 wt. % concentration, 0.12 grams of polymer sample (dry basis), and 89.88 grams of RO water were mixed together. Then, about 14.0 grams of the previous solution is titrated with a calcium chloride solution at an active concentration of 1.35 wt. % at 1.0 ml per hour over 1 hour of time. When an excess of calcium over the binding capacity of the chelant occurs, $CaCO_3$ is formed and precipitates, resulting in a sharp increase in turbidity. The inflection point of this turbidity indicates saturation of the chelant. The binding capacity is reported on a $CaCO_3$ equivalent mass over the weight of the chelant (in mg $CaCO_3/g$). In the context of the present invention, copolymer A is such that it has a minimum binding capacity of 350 mg $CaCO_3/g$ copolymer A. Preferably, copolymer A has a binding capacity in the range of 350 mg $CaCO_3/g$ copolymer A-700 mg $CaCO_3/g$ copolymer A. More preferably, copolymer A has a binding capacity in the range of 400 mg $CaCO_3/g$ copolymer A-600 mg $CaCO_3/g$ copolymer A.

Moreover, as noted above, copolymer A is also selected herein such that its ability to bind with $Ca^{2+}$ through the carboxylic acid functionality on the itaconic acid repeat unit is such that it shows acceptable solubility in water. The water solubility feature can also be quantified by what is termed a calcium tolerance determination. More specifically, 0.05 grams of copolymer A (dry basis), 0.04 grams of calcium chloride (dry basis) and 99.91 grams of water are mixed together to form a solution. Then, 14.0 grams of such solution is titrated with 0.1 N sodium hydroxide solution at 10.0 ml per hour over 300 seconds. The turbidity is recorded as a function of time. The calcium tolerance is reported as the difference of turbidity measurement at pH=11.0 and pH=6.0. Higher numbers therefore indicate relatively higher turbidity and relatively lower solubility of the copolymer in water solution.

Various formulations of copolymer A were prepared according to the following working examples:

Example I—Poly(Sodium Itaconate)

For comparison purposes, a commercial sample of the homopolymer poly (sodium itaconate), commercial name Itaconix DSP2K, produced by Itaconix Corporation, was employed. The granules had a moisture content of 15.3%, a monomer to polymer conversion greater than 98%, a number average molecular weight (Mn) of 2477 g/mol and a weight average molecular weight Mw of 5167 g/mol. The pH of a 10% solution in water was measured at 4.86.

Example II

To a 500 mL glass beaker, the following were added: 130 g of itaconic acid, 80 g of sodium hydroxide 50% aqueous solution, 16 g of sodium styrene sulfonate (88.4% active), 4.0 g of hypophosphorous acid (50% aqueous). The ingredients were mixed together with a stir bar, and heated to 95° C. Then 6.6 g of a 33 wt. % solution of sodium persulfate was added. The mixture was allowed to react, and removed from the heat source once the reaction mixture started to show exothermic behavior. The sample was left to cool to room temperature for 12 hours to a dry solid. It was then ground to a powder with a utility mechanical mixer. The final powder has a moisture content of 18.8%, a monomer to polymer conversion of 95%, a number average molecular weight Mn of 3783 g/mol and a weight average molecular weight Mw of 8988 g/mol. The pH of a 10% solution in water was measured at 5.58.

Example III

To a 500 mL glass beaker, the following were added: 130 g of itaconic acid, 80 g of sodium hydroxide 50% aqueous solution, 26 g of sodium styrene sulfonate (88.4% active), 4.0 g of hypophosphorous acid (50% aqueous). The ingredients were mixed together with a stir bar, and heated to 95° C. Then 6.6 g of a 33 wt. % solution of sodium persulfate was added. The mixture was allowed to react, and removed from the heat source once the reaction mixture started to show exothermic behavior. The sample was left to cool to room temperature for 12 hours to a dry solid. It was then ground to a powder with a utility mechanical mixer. The final powder has a moisture content of 17.3%, a monomer to polymer conversion of 95%, a number average molecular weight Mn of 4375 g/mol and a weight average molecular weight Mw of 10,033 g/mol. The pH of 10% solution in water was measured at 5.34.

Example IV

To a 500 mL glass beaker, the following were added: 130 g of itaconic acid, 80 g of sodium hydroxide 50% aqueous solution, 37 g of sodium styrene sulfonate (88.4% active), 4.0 g of hypophosphorous acid (50% aqueous). The ingredients were mixed together with a stir bar, and heated to 95° C. Then 6.6 g of a 33 wt. % solution of sodium persulfate was added. The mixture was allowed to react, and removed from the heat source once the reaction mixture started to show exothermic behavior. The sample was left to cool to room temperature for 12 hours to a dry solid. It was then ground to a powder with a utility mechanical mixer. The final powder has a moisture content of 16.7%, a monomer to polymer conversion of 91%, a number average molecular of 5393 g/mol and a weight average molecular weight Mw of 11,780 g/mol.

Example V

To a 500 mL glass beaker, the following were added: 130 g of itaconic acid, 80 g of sodium hydroxide 50% aqueous solution, 63 g of sodium styrene sulfonate (88.4% active)), 4.0 g of hypophosphorous acid (50% aqueous). The ingredients were mixed together with a stir bar, and heated to 95° C. Then 6.6 g of a 33 wt. % solution of sodium persulfate was added. The mixture was allowed to react, and removed from the heat source once the reaction mixture started to show exothermic behavior. The sample was left to cool to room temperature for 12 hours to a dry solid. It was then ground to a powder with a utility mechanical mixer. The final powder has a moisture content of 20.0%, a monomer to polymer conversion of 88%, a number average molecular weight Mn of 5750 g/mol and a weight average molecular weight Mw of 13,430 g/mol. The pH of a 10% solution in water was measured at 5.40.

Example VI

To a 500 mL glass beaker, the following were added: 130 g of itaconic acid, 80 g of sodium hydroxide 50% aqueous solution, 49 g of sodium styrene sulfonate (88.4% active). The ingredients were mixed together with a stir bar, and heated to 95° C. Then 6.6 g of a 33 wt. % solution of sodium persulfate was added. The mixture was allowed to react, and removed from the heat source once the reaction mixture started to show exothermic behavior. The sample was left to cool to room temperature for 12 hours to a dry solid. It was then ground to a powder with a utility mechanical mixer. The final powder has a moisture content of 19.6%, a monomer to polymer conversion of 89%, a number average molecular weight Mn of 5908 g/mol and a weight average molecular weight Mw of 14,600 g/mol. The pH of 10% solution in water was measured at 5.15.

Example VII

To a 10 L glass reactor, with mechanical stirring, and a heated circulating water jacket set to 70° C., the following were added: 2730 g of itaconic acid, 1680 g of sodium hydroxide 50% aqueous solution, 565 g of AMPS (88% active), 113.4 g of hypophosphorous acid. The ingredients were mixed together with a stir bar, and heated to 77° C. Then a solution made with 94.5 g of sodium persulfate and 189 g of water was added to the reactor. The mixture was allowed to start reacting and removed from the reactor when it reached 90° C. The sample was left to cool to room temperature for 12 hours to a dry solid. It was then ground to a powder with a utility mechanical mixer. The final powder has a moisture content of 14.74%, a monomer to polymer conversion of greater than 98%, a number average molecular weight Mn of 2224 g/mol and a weight average molecular weight Mw of 5345 g/mol

Example VIII

A continuous polymerization train was used to prepare a copolymer of itaconic acid and sodium styrene sulfonate. Over the duration of this reaction, 34,880 grams of itaconic acid was combined with 6614 grams of sodium styrene sulfonate, 8869 grams of sodium hydroxide, 1450 grams of hypophosphorous acid, 1208 grams of sodium persulfate and 9407 grams of water. The final polymer was a powder with a moisture content of 15.1%, a monomer to polymer conversion of greater than 98%, a number average molecular weight Mn of 2005 g/mol and a weight average molecular weight Mw of 4096 g/mol. The pH of a 10% solution in water was measured at 5.12.

Example IX—Decarboxylation

To an 8 L pressure reactor 2000 g of water (reverse osmosis grade) was mixed with 1940 of polymer from Example VII. Heat was provided through an electric heater, with a pressure regulator set to 15 psi. Heat was maintained for 3 hours before cooling. The resulting solution was a dark brown solution with a moisture content of 60%. The pH of a 10% solution in water was measured at 6.36. Titration for the number of functional carboxylic acids, resulted in the determination that 70% of the initial carboxylic acids where no longer present.

Example X—Decarboxylation

To an 8 L pressure reactor 2000 g of water (reverse osmosis grade) was mixed with 2000 of polymer from Example VIII. Heat was provided through an electric heater, with a pressure regulator set to 15 psi. Heat was maintained for 3 hours before cooling. The resulting solution was a dark brown solution, with a moisture content of 58.4%. The pH of a 10% solution in water was measured at 6.38. Titration for the number of functional carboxylic acids, resulted in the determination that 83% of the initial carboxylic acids where no longer present.

In all of the above Examples, it should be noted that determination of the identified parameters proceeded as follows:

Moisture Content

A moisture scale analyzer was utilized. It records weight as function of time, while maintaining the sample at 110° C. using an infrared heater. When a constant weight is recorded for 30 seconds, the test is completed and the weight recorded as a percent decrease from the initial weight. All moisture contents are expressed as weight percent.

Determination of pH

All pHs are reported in solutions at 10 wt % in RO water at room temperature. The pH probe is a Tris-Compatible flat sensor. The pH meter is calibrated using pH=4 and pH=7 standard solutions prior to any measurement reading.

Molecular Weight Determination

Gel Permeation Chromatography (GPC) was used to determine molecular weights. The GPC is first equilibrated with the eluent (1.67% sodium nitrate in HPLC-grade water) through three TOSOH Bioscience 08026 GPC columns for approximately one hour at 1 ml/min. A refractive index detector (RID) is used to measure signal concentration. The RID is purged for 20 minutes before sample analysis is started. The following instrument conditions are used: Eluent: 1.67 wt. % sodium nitrate in HPLC-grade water with inline degasser; Flow Rate: 1.0 mL/min; Run Time: 45 min; Injection volume: 100 µL; Draw/Eject Speed: 200 µL/min; RID Optics Temperature: 40° C.; Automatic Purge: min; Column Temperature: 35° C.

A 1 wt. % polymer solution is prepared using the GPC eluent solution as solvent. This solution is filtered with a 0.2 µM syringe-tip filter into a 2 mL HPLC vial which is then crimped closed. The vial is placed into the GPC autosampler and the chromatographic run is initiated. Molecular weight calibration was done using 6 polyacrylic acid standards with molecular weights ranging from 1000 g/mole to 1,360,000 g/mole, and with itaconic acid (monomer molecular weight of 130). The 7 standards are used to create a 3rd order polynomial interpolation between peak elution time and molecular weights. Each unknown sample is evaluated using this calibration function.

Conversion was calculated by the relative area of the residual monomer peak (with the longest elution time) over the total (polymer+monomer) area. Conversion is expressed as a weight percentage.

Determination of Decarboxylation Levels

A 10 g polymer solution at 15 wt. % solid content is prepared by diluting the polymer solution with reverse osmosis (RO) water. Accurate moisture content of this solution is recorded using a moisture analyzer scale. In a plastic beaker with a lid mix 5.0 g of the 15 wt. % polymer solution previously made, one adds 7.5 g of 1N HCl, and 50.0 g RO water. A mixing bar is placed in the beaker and the sample is placed on a stir plate. A pH probe is calibrated with standards at pH=1.00 and pH=13.00. A 20 mL syringe is filled with 1M NaOH and placed on an automatic syringe pump just over the mixing solution on the stir plate. A data logger is used to record pH as a function of time with a recording every second for 1500 seconds. Data recording and sodium hydroxide addition at the rate of 50 ml/hr through the automatic syringe pump are started at the same time. When the pH reaches about 12 the pump is stopped as well as the data collection. The decarboxylation is reported as one (1) minus the number of acid functions identified at pH greater than 7, divided by the total number of acid functionality in the starting polymer sample (assuming 2 acids per repeating unit of itaconic acid), and expressed as a %.

Table 1 below provides a summary of the binding capacity, calcium tolerance (i.e. relative solubility in water upon uptake of $Ca^{2+}$) for Example I (poly[sodium itaconate]) and Examples II-VI (copolymer A) as one introduces sodium styrene sulfonate (NaSS) at the indicated percent by weight in copolymer A:

TABLE 1

Properties of Copolymer A Compared to Poly(sodium itaconate)

| Example | Wt. % NaSS Comonomer | Binding capacity (mg CaCO3/gr) | Calcium Tolerance: Turbidity @ pH = 11 − Turbidity @ pH = 6 | Dispersant Capacity − Turbidity at 400 seconds (NTU)[1] |
|---|---|---|---|---|
| I | 0 | 576 | 203 | |
| II | 10 | 553 | 80 | 70 |
| III | 15 | 507 | 20 | 90 |
| IV | 20 | 470 | 7 | |
| V | 25 | 424 | −4 | 125 |
| VI | 30 | 387 | −4 | 98 |

[1]Dispersant Capacity is discussed below in more detail with regards to copolymer B.

As may be appreciated, at pH=11.0, the carboxylate groups of the homopolymer of poly(itaconic acid) are in the form of the sodium salt (—COO$^-$Na$^+$). This is observed to still provide for exchange with $Ca^{2+}$ but the polymer shows relative insolubility with a turbidity value of 203. Upon incorporation of 10% by weight of co-monomer of NaSS, the binding capacity is observed to be reduced, as there are less carboxylate groups to bind with $Ca^{2+}$, but the introduction of the NaSS is observed to reduce turbidity, indicating a higher relative solubility in the aqueous environment. Accordingly, the introduction of the NaSS provides the feature that the $Ca^{2+}$ loaded copolymer is relatively more soluble in water, while still providing for useful $Ca^{2+}$ binding capability.

Table 2 provides a summary of the binding capacity and calcium tolerance (i.e. relative solubility in water upon uptake of $Ca^{2+}$) for copolymer A, namely Examples VII-X. Note that Examples IX and X are decarboxylated according to the method described in U.S. Pat. No. 9,487,423.

TABLE 2

| Example | Wt. % Comonomer | Binding Capacity (mg CaCO3/gr) | Calcium Tolerance: Turbidity @ pH = 11 − Turbidity @ pH = 6 | Dispersant Capacity − Turbidity at 400 seconds (NTU)[1] |
|---|---|---|---|---|
| VII | 15% AMPS | 506 | −5 | |
| VIII | 15% NaSS | 470 | 25 | |
| IX | 15% AMPS | 309 | +10 | 170 |
| X | 15% NaSS | 238 | 5 | 173 |

[1]Dispersant Capacity is discussed below in more detail with regards to copolymer B.

Similar conclusions can be drawn from Table 2 as in Table 1, with respect to introduction of the comonomer containing sulfonic acid functionality. Namely, while there is a drop in binding capacity as compared to the poly(sodium itaconate), Example 1, the introduction of the comonomer containing sulfonic acid functionality and copolymerization with itaconic acid to provide the corresponding copolymer is observed to reduce turbidity, again indicating a higher relative solubility in the aqueous environment while still providing for useful $Ca^{2+}$ binding capability.

In the broad context therefore of the present invention, copolymer A preferably indicates a binding capacity in the range of 350 mg $CaCO_3$/g copolymer A to 700 mg $CaCO_3$/g copolymer A and a corresponding calcium tolerance (Turbidity @ pH=11−Turbidity @ pH=6) of less than or equal to 100 or in the range of −10 to 100. More preferably, the calcium tolerance is preferably less than or equal to 80 or in the range of −10 to 80, and even more preferably in the range of −10 to 50 or −10 to 30.

A second component of the detergent composition herein is copolymer B. Copolymer B is preferably prepared by copolymerization of a monocarboxylic acid vinyl monomer and a sulfonated vinyl monomer. Copolymer B is water soluble and provides a desired dispersant capacity, discussed more fully herein, as well as anti-scaling performance. The monocarboxylic vinyl monomers and sulfonated vinyl monomers that are preferably employed therefore include the following which are illustrated as applied for formation of the corresponding polymer structures described herein for Copolymer B:

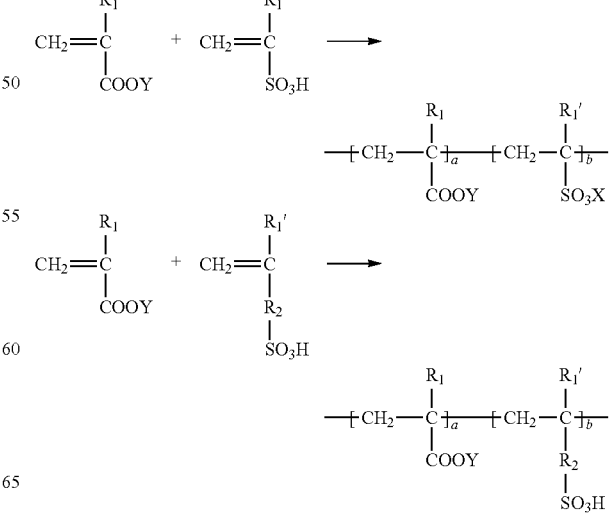

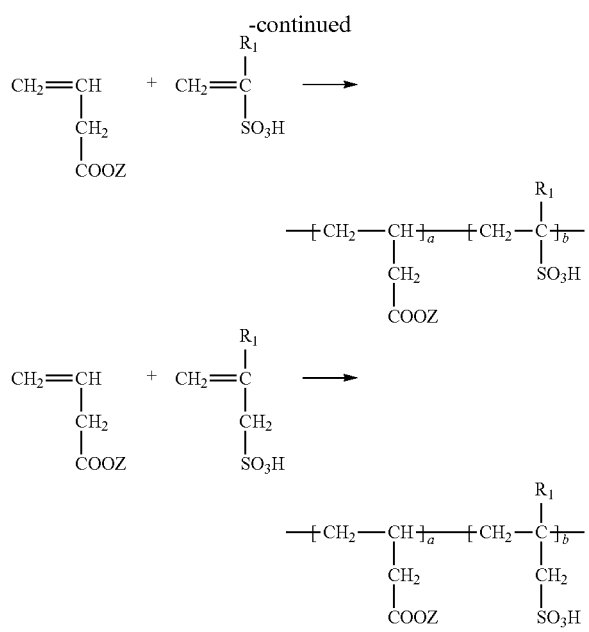

In the above, $R_1$ and $R_1'$ are a hydrogen or an alkyl group ($-CH_3$, $-CH_2CH_3-$, $-CH_2CH_2CH_3$) and can be the same or different; X, Y and Z are either hydrogen or $Na^+$, $Li^+$, $K^+$ and/or $NH_4^+$ and can be the same or different; $R_2$ is an alkyl group ($-CH_2-$, $-CH_2CH_2-$, $-CH_2CH_2CH_2-$, $-C-(CH_3)_2$) or an aromatic group or an ester group ($-COOCH_2-$) or an amido group ($-CONH-$) to thereby provide acrylamide-alkyl sulfonic acid functionality ($-CONH-R_3-SO_3X$) where $R_3$ is an alkyl group ($-CH_2-$, $-CH_2CH_2-$, $-CH_2CH_2CH_2-$, $-C-(CH_3)_2$, $-C-(CH_3)_2-CH_2-$); and the weight percent of repeat unit "a" in copolymer B is in excess to the weight percent of repeat unit "b".

Copolymer B preferably has a number average MW or Mn value in the range of 1000 g/mole to 20,000 g/mole. More preferably, copolymer B has a Mn value in the range of 2,000 g/mole to 6,000 g/mole. In addition, the weight percent of repeat unit "b" in the above formula is preferably 5.0% by weight to 40.0% by weight, more preferably 10.0% by weight to 30.0% by weight, which means that the repeat unit "a" is in an excess amount. For example, the excess amount of repeat unit "a" may preferably fall in the range of 95.0% by weight to 60.0% by weight.

One particularly preferred copolymer B is available from Dow and is sold under the tradename ACUSOL™ 588G, as a copolymer of an acrylic acid and a vinyl sulfonic acid, specifically 2-acrylamido-2-methylpropane sulfonate. Another preferred copolymer B is available from Coatex and is sold under the tradename RHEOSOLVE™ D12ASG, which is also a copolymer of acrylic acid and 2-acrylamdio-2-methylpropane sulfonate. Both of these acrylic acid/vinyl sulfonic acid copolymers indicate a Mw value of about 15,000.

The dispersion characteristics of copolymer B herein was characterized by a dispersion capacity measurement as follows: a calcium titration method was employed while measuring turbidity. Sodium carbonate (0.06 grams), polymer sample (0.04 g, dry basis) and 99.9 grams of RO water were mixed together to form a solution. Then, 14.0 grams of such solution is titrated with a calcium chloride solution at an active concentration of 2.0 wt. % at 10.0 ml per hour over 10 minutes of time at room temperature. The turbidity (cloudiness) is evaluated with a calibrated Nephelometer and the units of turbidity are called Nephelometric Turbidity Units (NTU units).

Deionized water (0 NTU) and a reference sample with 100 NTU were employed. NTU is measured at 400 seconds and used to reflect the dispersion efficacy of the copolymer.

It may therefore be appreciated that the above titration method generates an increasing amount of calcium carbonate that can be effectively dispersed or inhibited from its formation by the polymeric dispersant. A low turbidity value of the solution past 400 seconds reflects the dispersing capability of the copolymer. Accordingly, the dispersion capacity of copolymer B herein is selected such that, when in aqueous solution in the presence of sodium carbonate, and titrated with a 2.0 wt. % calcium chloride solution, at 10.0 ml per hour over 10 minutes of time at room temperature, copolymer B indicates a turbidity in the range of 0 to 50 NTU, more preferably in the range of 0 to 25 NTU. In such regard, it is noted that copolymer B when preferably selected from Acusol 588G (Dow) indicated a turbidity of 14 NTU and when preferably selected from Rheosolve D12ASG (COATEX) also indicated a turbidity of 14 NTU. In addition, for reference purposes, the turbidity of the homopolymer of poly(acrylic acid), utilizing Acusol 445ND (Dow), was 195 NTU.

Automatic dishwashing formulations were next evaluated, and Table 3 below provides formulation details and testing results. An automatic dishwashing formulation herein is broadly understood as a detergent formulation that is employed for dishwashing which may therefore include a number of ingredients in addition to the copolymer A and copolymer B herein. Such composition may preferably involve two components, one of which is a solid component and the other which is a liquid component. Such components may be provided in the form of a water soluble pouch, preferably a multi-compartment pouch.

Copolymer A is selected from Examples II to V from Table 1. Copolymer B is selected from Rheosolve D12ASG. The solid compartment dose is followed by a listing in weight percent of the ingredients of the solid compartment. Similarly, the liquid compartment dose is followed by a listing in weight percent of the liquid compartment.

TABLE 3

Automatic Dishwashing Formulations with Examples II to V of Table 1

| Formulation | F1 | F2 | F3 | F4 |
|---|---|---|---|---|
| Solid compartment dose | 14 gr | 14 gr | 14 gr | 14 gr |
| Sodium carbonate (light) | 46.30 | 46.30 | 46.30 | 46.30 |
| Example II | 9.70 | | | |
| Example III | | 9.70 | | |
| Example IV | | | 9.70 | |
| Example V | | | | 9.70 |
| Rheosolve D 12 ASG | 4.80 | 4.80 | 4.80 | 4.80 |
| Dehypon GRA | 0.40 | 0.40 | 0.40 | 0.40 |
| Everlase 12.0T | 1.30 | 1.30 | 1.30 | 1.30 |
| Effectenz S 1000 | 0.60 | 0.60 | 0.60 | 0.60 |
| Sodium sulfate | 20.90 | 20.90 | 20.90 | 20.90 |
| Sodium percarbonate (coated) | 13.70 | 13.70 | 13.70 | 13.70 |
| PQ H20 | 2.30 | 2.30 | 2.30 | 2.30 |
| Total | 100.00 | 100.00 | 100.00 | 100.00 |
| Liquid compartment dose | 1.7 gr | 1.7 gr | 1.7 gr | 1.7 gr |
| Water | 10.00 | 10.00 | 10.00 | 10.00 |
| SLF 180 | 45.00 | 45.00 | 45.00 | 45.00 |

TABLE 3-continued

Automatic Dishwashing Formulations
with Examples II to V of Table 1

| Formulation | F1 | F2 | F3 | F4 |
|---|---|---|---|---|
| TD6 | 33.75 | 33.75 | 33.75 | 33.75 |
| TD7 | 11.25 | 11.25 | 11.25 | 11.25 |
| Total | 100.00 | 100.00 | 100.00 | 100.00 |
| Test scores | | | | |
| Spotting on glass after 5 cycles | 1.13 | 1.13 | 1.21 | 1.21 |
| Filming on glass after 5 cycles | 3.00 | 1.81 | 1.81 | 1.25 |

In Table 3, the following can be noted for the identified commercial ingredients: Dehypon GRA is a non-ionic surfactant; Everlase 12T is a protease enzyme available from DuPont; Efectenz S1000 is an amylase enzyme; PQ H20 is a disilicate from PQ Corporation; SLF180 is a non-ionic polymeric surfactant from BASF; TD6 is a non-ionic surfactant made from a C13 chain and a polyethylene oxide block with n=6 for the ethylene oxide repeat unit; TD7 is a non-ionic polymeric surfactant made from a C13 chain and a polyethylene oxide block with n=7 for the ethylene oxide repeat unit.

Test scores are identified in Table 3. Specifically, the results of an automatic dishwasher performance test according to ASTM D3556 (Approved Nov. 1, 2014). This test proceeds by utilizing using four (4) identical 4 Maytag dishwasher in parallel, with water hardness set at 330 ppm. Evaluation of filming and spotting on 8 glasses was done after 4 or 5 cycles. Performance is reported according to the ASTM method as a score for spotting on glass and as a score for filming on glass, both on a scale of 1 to 5 (the lower the number the better).

As can now be seen from Table 3, Example III, with 15% sulfonate comonomer in the copolymer A, performed better than the polymers from Example II and IV (10 and 20% sulfonate comonomer in copolymer A respectively). Table 3 also indicates that polymer from Example V with 25% sulfonate comonomer in copolymer A performed better than the polymer from Example IV with 20% sulfonate comonomer in copolymer A.

Table 4 below identifies other automatic dishwashing formulations herein evaluated for spotting and filming again under ASTM D3556 (Approved Nov. 1, 2014) where copolymer A is selected from Example 8 of Table 1 and copolymer B is selected from Acusol 588G. Once again, the solid compartment dose is followed by a listing in weight percent of the ingredients of the solid compartment.

TABLE 4

Automatic Dishwashing Formulations
with Example VIII of Table 1

| Formulation | F5 | F6 | F7 | F8 |
|---|---|---|---|---|
| Solid compartment dose | 18 gr | 18 gr | 18 gr | 18 gr |
| Sodium metasilicate | 2.2 | 2.2 | 2.2 | 2.2 |
| Sodium Carbonate dense | 41.1 | 41.1 | 41.1 | 41.1 |
| SLF 180 | 3.3 | 3.3 | 3.3 | 3.3 |
| Polyaspartic acid, sodium salt | 2.2 | 2.2 | 2.2 | 2.2 |
| Sodium citrate | 33.3 | | | |
| Protease | 1.1 | 1.1 | 1.1 | 1.1 |
| Stainzyme 12T | 0.3 | 0.3 | 0.3 | 0.3 |
| Sodium Sulfate anhydrous | 4.8 | 32.1 | 29.1 | 29.1 |
| Sodium Percarbonate coated | 11.1 | 11.1 | 11.1 | 11.1 |

TABLE 4-continued

Automatic Dishwashing Formulations
with Example VIII of Table 1

| Formulation | F5 | F6 | F7 | F8 |
|---|---|---|---|---|
| Valfor 100 Zeolite | 0.6 | 0.6 | 0.6 | 0.6 |
| Example VIII | | 6.0 | 9.0 | 6.0 |
| Acusol 588G | | | | 3.0 |
| Total | 100.0 | 100.0 | 100.0 | 100.0 |
| Test scores | | | | |
| Spotting on glass after 5 cycles | 2.0 | 1.5 | 1.5 | 1.5 |
| Filming on glass after 5 cycles | 4.0 | 5.0 | 5.0 | 3.5 |

In the above Table 4, is can first be noted that Stainzyme 12T is an amylase available from Novozyme and Valfor 100 is a zeolite available from PQ corporation. Table 4 indicates that copolymer A from Example VIII performs significantly better than sodium citrate. Table 4 also indicates that copolymer A from Example VIII performs better when combined with copolymer B (Acusol 588G).

Table 5 below identifies still other automatic dishwashing formulations herein evaluated for spotting and filming again under ASTM D3556 (Approved Nov. 1, 2014) where copolymer A is again selected from Example VIII of Table 1 and copolymer B is selected from Acusol 588G. Reference is also made to the use of Acusol 445 ND, which as noted above, is a hompolymer of acrylic acid. The solid compartment dose is followed by a listing in weight percent of the ingredients of the solid compartment. Similarly, the liquid compartment dose is followed by a listing in weight percent of the liquid compartment.

TABLE 5

Automatic Dishwashing Formulations
with Example VIII of Table 1

| Formulation | F9 | F10 | F11 | F12 |
|---|---|---|---|---|
| Solid compartment dose | 14 gr | 14 gr | 14 gr | 14 gr |
| Sodium carbonate (dense) | 46.30 | 46.30 | 46.30 | 46.30 |
| Example VIII | 12.00 | 12.00 | 12.00 | 9.60 |
| Acusol 588G | 6.00 | 4.80 | 3.60 | 4.80 |
| Acusol 445ND | | 1.20 | 2.40 | |
| Everlast 6T | 3.10 | 3.10 | 3.10 | 3.10 |
| Purastar ST 6000 E | 0.80 | 0.80 | 0.80 | 0.80 |
| Sodium sulfate | 15.40 | 15.40 | 15.40 | 19.00 |
| Sodium percarbonate (coated) | 13.70 | 13.70 | 13.70 | 13.70 |
| PQ britesil H20 | 2.30 | 2.30 | 2.30 | 2.30 |
| Total | 100.00 | 100.00 | 100.00 | 100.00 |
| Liquid compartment dose | 1.7 gr | 1.7 gr | 1.7 gr | 1.7 gr |
| Water | 10.00 | 10.00 | 10.00 | 10.00 |
| SLF 180 | 45.00 | 45.00 | 45.00 | 45.00 |
| TD6 | 33.75 | 33.75 | 33.75 | 33.75 |
| TD7 | 11.25 | 11.25 | 11.25 | 11.25 |
| Total | 100.00 | 100.00 | 100.00 | 100.00 |
| Test scores | | | | |
| Spotting on glass after 5 cycles | 1.9 | 1.6 | 1.6 | 2.2 |
| Filming on glass after 5 cycles | 1.5 | 2.0 | 2.5 | 1.5 |

In Table 5, the following is noted regarding the commercial ingredients: Everlast 6T is protease from Novozyme and Purastar ST600e is an enzyme from Genencor. Table 5 indicates that copolymer A from Example VIII when combined with copolymer B (Acusol 588G) containing a sulfonate, performs exceptionally well. The addition of Acusol 445ND (a homopolymer of acrylic acid), while optional, appeared to increase filming while reducing spotting. Table 5 also indicates that a relatively higher amount of copolymer A of Example VIII with copolymer B (Acusol 588G) is beneficial with regards to spotting and filming results (compare formulations F9 and F12).

Table 6 below identifies still other automatic dishwashing formulations herein evaluated for spotting and filming again under ASTM D3556 (Approved Nov. 1, 2014) where copolymer A is selected from Examples VII and VIII, of Table 1 and copolymer B is selected from Rhesolve D12 ASG. Table 6 also shows the use of decarboxylated copolymer A, by way of Examples IX and X. The solid compartment dose is followed by a listing in weight percent of the ingredients of the solid compartment. Similarly, the liquid compartment dose is followed by a listing in weight percent of the liquid compartment.

TABLE 6

Automatic Dishwashing Formulations with Examples VII to X of Table 1

| Formulation | F13 | F14 | F15 | F16 |
| --- | --- | --- | --- | --- |
| Solid compartment dose | 14 gr | 14 gr | 14 gr | 14 gr |
| Sodium carbonate (dense) | 46.30 | 46.30 | 46.30 | 46.30 |
| Example VIII | 9.60 | 9.60 | 9.60 | |
| Example VII | | | | 9.60 |
| Rhesolve D 12 ASG | 4.80 | | | 4.80 |
| Example IX | | 4.80 | | |
| Example X | | | 4.80 | |
| Everlast 6T | 3.10 | 3.10 | 3.10 | 3.10 |
| Purastar ST 6000 E | 0.80 | 0.80 | 0.80 | 0.80 |
| Sodium sulfate | 19.40 | 19.40 | 19.40 | 19.40 |
| Sodium percarbonate (coated) | 13.70 | 13.70 | 13.70 | 13.70 |
| PQ britesil H20 | 2.30 | 2.30 | 2.30 | 2.30 |
| Gross total | 100.00 | 100.00 | 100.00 | 100.00 |
| Total | 100.00 | 100.00 | 100.00 | 100.00 |
| Liquid compartment dose | 1.7 gr | 1.7 gr | 1.7 gr | 1.7 gr |
| Water | 10.00 | 10.00 | 10.00 | 10.00 |
| BASF Dehypon GRA | 3.29 | 3.29 | 3.29 | 3.29 |
| SLF180 | 41.7 | 41.7 | 41.7 | 41.7 |
| TD-6 | 33.75 | 33.75 | 33.75 | 33.75 |
| TD-7 | 11.25 | 11.25 | 11.25 | 11.25 |
| Total | 100.00 | 100.00 | 100.00 | 100.00 |
| Test scores | | | | |
| Spotting on glass after 4 cycles | 1.35 | 1.5 | | |
| Filming on glass after 4 cycles | 1.5 | 2.67 | | |
| Spotting on glass after 5 cycles | 1.4 | | 1.4 | |
| Filming on glass after 5 cycles | 1.8 | | 4 | |
| Spotting on glass after 5 cycles | 1.3 | | | 1.3 |
| Filming on glass after 5 cycles | 1.4 | | | 1.7 |

Table 6 indicates that polymer from copolymer A made according to Example VII and VIII performs well in spotting and film testing when combined with copolymer B, Rheosolve D12 ASG. In addition, it can be seen in Table 6 that the use of decarboxylated copolymer A, namely in formulations F14 and F15, increased the amount of filming observed.

From the above, and in the broad context of the present invention, it can be appreciated that in a given dishwashing formulation, preferably, the level of copolymer A is in the range of 2.0% by wt. to 30.0% by wt. and the level of copolymer B is in the range of 1.0% by wt. to 15.0% by wt., where such percent by weight is reference to the level of copolymer A and/or copolymer B in the detergent formulation. Such weight percents of copolymer A and/or B can therefore be satisfied by placement of copolymer A and/or copolymer B in either the solid compartment dose and/or the liquid compartment dose. In addition, the use of copolymer A and copolymer B in a dishwashing detergent formulation herein is such that it preferably provides, according to ASTM D3556 (Approved Nov. 1, 2014), a spotting on glass after 5 cycles of ≤2.0 and a filming on glass after 5 cycles of ≤2.0.

The dishwashing formulation herein is also one that can be conveniently combined with other reagents. For example, the dishwashing formulation herein may be preferably combined with inorganic bases including sodium hydroxide, sodium carbonate, sodium bicarbonate, potassium carbonate, potassium bicarbonate, sodium silicate and sodium metasilicate. The amount of such inorganic bases may be such that, individually or in combination, they are present in the dishwashing formulation which contains the above referenced copolymer A and copolymer B, at a level of 1.0% by weight to 50.0% by weight.

The dishwashing formulation may also include chelants that preferably complex calcium. Such chelants preferably have a MW ≤700 g/mole and are preferably present at a level of 0.1% to 30.0% by weight in the formulation and include, but are not limited to amino carboxylates such methylglycinediacetic acid (MGDA) and N,N-Dicarboxymethyl glutamic acid (GLDA), phosphonates such as editronic acid, citric acid, their alkaline salts, or sodium tripolyphosphate (STPP).

The dishwashing formulation may also contain non-ionic sufactants. Examples of such non-ionic surfactants including but not limited to polyalkylene oxides that have either an alcohol, ether or alkoxy type end group, such as polyethylene glycol alkyl ethers, polypropylene glycol alkyl ethers or polyether alcohols. The amount of non-ionic surfactant may be at the level of 0.05% by weight to 15.0% by weight in the dishwashing formulation.

One may also include the following in the dishwashing formulation: (1) enzymes such as protease and/or amylase at a level of 0.05% by weight to 5.0% by weight; (2) bleaching agents which may be generally described as oxidizing agents and which may therefore include sodium percarbonate and/or sodium perborate, and are present in the range of 0.5% by weight to 25.0% by weight; (3) activators such as tetraacetylethylenediamine (TAED) which may be present at a level of 0.1% by weight to 5.0% by weight; (3) bleaching catalysts such as manganese trimethyl-1,4,7-triazacyclononane (Mn-TACN) present at a level of 0.0001% by weight to 0.3% by weight.

In addition, the dishwashing formulation herein may be convenient contained within a water soluble film. Such water soluble film may preferably include poly(vinyl alcohol) based polymer film, where the dishwashing formulation herein is places in one or more selected compartments, including separating the solid and the liquids components of the formulation in two or more compartments. Such dishwashing formulation contained with the poly(vinyl alcohol) film may then preferably provide controlled dosing of the dishwashing formulation and provide, e.g., 5.0 grams to 25.0 grams of dishwashing formulation herein upon release.

It is also contemplated herein that the dishwashing formulation can be present in solid form and include powders or granules as well as compacted forms, such as tablets that can dissolve in water. Such tablets may be of a variety of geometric shapes, including but not limited to parallelepipedes, obloides, or cylinders. The tablet may preferably be contained within a water soluble film as described herein.

What is claimed is:

1. A composition comprising:

(a) a first copolymer A selected from the following:

$$-[CH_2-\underset{\underset{COOZ}{|}}{\underset{|}{\overset{COOY}{\overset{|}{C}}}}-]_a-[CH_2-\underset{SO_3X}{\overset{R_1}{\overset{|}{C}}}-]_b-$$

or $$-[CH_2-\underset{\underset{COOZ}{|}}{\underset{|}{\overset{COOY}{\overset{|}{C}}}}-]_a-[CH_2-\underset{R_2}{\underset{|}{\overset{R_1}{\overset{|}{C}}}}-]_b-$$
$$\phantom{-[CH_2-\underset{\underset{COOZ}{|}}{\underset{|}{\overset{COOY}{\overset{|}{C}}}}-]_a-[CH_2-\underset{R_2}{\underset{|}{\overset{R_1}{\overset{|}{C}}}}}\underset{SO_3X}{|}$$

wherein $R_1$ is a hydrogen or a —$CH_3$, —$CH_2CH_3$, —$CH_2CH_2CH_3$ group;

X, Y and Z are either hydrogen or $Na^+$, $Li^+$, $K^+$ and/or $NH_4^+$ and can be the same or different;

$R_2$ is a —$CH_2$—, —$CH_2CH_2$—, —$CH_2CH_2CH_2$—, or —$C$—$(CH_3)_2$ group or an aromatic group or an ester group (—$COOCH_2$—) or an amido group (—$CONH$—) to thereby provide acrylamide-alkyl sulfonic acid functionality (—$CONH$—$R_3$—$SO_3X$) where $R_3$ is a —$CH_2$—, —$CH_2CH_2$—, —$CH_2CH_2CH_2$—, —$C$—$(CH_3)_2$, or —$C$—$(CH_3)_2$—$CH_2$— group wherein the weight percent of repeat unit "a" in copolymer A is in excess to the weight percent of repeat unit "b" and repeat unit "b" is present at 15 wt. % to 40 wt. %;

(b) a second copolymer B selected from the following $$-[CH_2-\underset{COOY}{\underset{|}{\overset{R_1}{\overset{|}{C}}}}-]_a-[CH_2-\underset{SO_3X}{\overset{R_1'}{\overset{|}{C}}}-]_b-$$

or $$-[CH_2-\underset{COOY}{\underset{|}{\overset{R_1}{\overset{|}{C}}}}-]_a-[CH_2-\underset{R_2}{\underset{|}{\overset{R_1'}{\overset{|}{C}}}}-]_b-$$
$$\phantom{-[CH_2-\underset{COOY}{\underset{|}{\overset{R_1}{\overset{|}{C}}}}-]_a-[CH_2-\underset{R_2}{\underset{|}{\overset{R_1'}{\overset{|}{C}}}}}\underset{SO_3X}{|}$$

or $$-[CH_2-\underset{\underset{CH_2COOZ}{|}}{\underset{|}{\overset{\phantom{R_1}}{\overset{\phantom{|}}{CH}}}}-]_a-[CH_2-\underset{SO_3X}{\overset{R_1}{\overset{|}{C}}}-]_b-$$
$$\phantom{-[CH_2-}\underset{CH_2}{|}$$

or $$-[CH_2-\underset{\underset{CH_2COOZ}{|}}{\underset{|}{\overset{\phantom{R_1}}{\overset{\phantom{|}}{CH}}}}-]_a-[CH_2-\underset{SO_3X}{\overset{R_1}{\overset{|}{C}}}-]_b-$$
$$\phantom{-[CH_2-}\underset{CH_2}{|}$$

wherein $R_1$ and $R_1'$ are a hydrogen or a —$CH_3$, —$CH_2CH_3$, —$CH_2CH_2CH_3$ group and can be the same or different;

X, Y and Z are either hydrogen or $Na^+$, $Li^+$, $K^+$ and/or $NH_4^+$ and can be the same or different;

$R_2$ is —$CH_2$—, —$CH_2CH_2$—, —$CH_2CH_2CH_2$—, or —$C$—$(CH_3)_2$ or an aromatic group or an ester group (—$COOCH_2$—) or an amido group (—$CONH$—) to thereby provide acrylamide-alkyl sulfonic acid functionality (—$CONH$—$R_3$—$SO_3X$) where $R_3$ is —$CH_2$—, —$CH_2CH_2$—, —$CH_2CH_2CH_2$—, —$C$—$(CH_3)_2$, or —$C$—$(CH_3)_2$—$CH_2$—; and wherein the weight percent of repeat unit "a" in copolymer B is in excess to the weight percent of repeat unit "b" and repeat unit "b" is present at 15 wt. % to 40 wt. %.

2. The composition of claim 1 wherein copolymer A indicates a binding capacity in the range of 350 mg $CaCO_3$/g copolymer A to 700 mg $CaCO_3$/g copolymer A.

3. The composition of claim 1 wherein copolymer A indicates a calcium tolerance (turbidity at pH 11 minus turbidity at pH 6) of less than or equal to 100.

4. The composition of claim 1 wherein copolymer A indicates a calcium tolerance (turbidity at pH 11 minus turbidity at pH 6) of −10 to 100.

5. The composition of claim 1 wherein copolymer A indicates a binding capacity in the range of 350 mg $CaCO_3$/g copolymer A to 700 mg $CaCO_3$/g copolymer A and a calcium tolerance (turbidity at pH 11 minus turbidity at pH 6) of less than or equal to 100.

6. The composition of claim 1 wherein copolymer B indicates a dispersant capacity as indicated by turbidity, as measured by titration of a solution of copolymer B with a calcium chloride solution at a concentration of 2.0 wt % at 10.0 ml per hours over 10 minutes of time at room temperature, wherein said turbidity at 400 seconds is in the range of 0-50 NTU.

7. The composition of claim 1 wherein with respect to copolymer A, the weight percent of repeat unit "a" is 60.0% by weight to 85.0% by weight.

8. The composition of claim 1 wherein with respect to copolymer B, the weight percent of repeat unit "a" is 60.0% by weight to 85.0% by weight.

9. The composition of claim 1 wherein copolymer A has a Mn value in the range of 1000 g/mole to 20,000 g/mole.

10. The composition of claim 1 wherein copolymer B has a Mn value in the range of 1000 g/mole to 20,000 g/mole.

11. The composition of claim 1 combined into a dishwashing detergent formulation.

12. A dishwashing detergent formulation comprising:

(a) 2.0% by wt. to 30.0% by wt. of a first copolymer A selected from the following:

$$-[CH_2-\underset{\underset{COOZ}{|}}{\underset{|}{\overset{COOY}{\overset{|}{C}}}}-]_a-[CH_2-\underset{SO_3X}{\overset{R_1}{\overset{|}{C}}}-]_b-\quad\text{or}$$

-continued

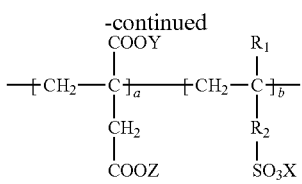

wherein $R_1$ is a hydrogen or a —$CH_3$, —$CH_2CH_3$, —$CH_2CH_2CH_3$ group;

X, Y and Z are either hydrogen or $Na^+$, $Li^+$, $K^+$ and/or $NH_4^+$ and can be the same or different;

$R_2$ is a —$CH_2$—, —$CH_2CH_2$—, —$CH_2CH_2CH_2$—, or —C—$(CH_3)_2$ group or an aromatic group or an ester group (—$COOCH_2$—) or an amido group (—CONH—) to thereby provide acrylamide-alkyl sulfonic acid functionality (—CONH—$R_3$—$SO_3X$) where $R_3$ is a —$CH_2$—, —$CH_2CH_2$—, —$CH_2CH_2CH_2$—, —C—$(CH_3)_2$, or —C—$(CH_3)_2$—$CH_2$— group;

wherein the weight percent of repeat unit "a" in copolymer A is in excess to the weight percent of repeat unit "b" and repeat unit "b" is present at 15 wt. % to 40 wt. %;

(b) 1.0% by wt. to 15.0% by wt. of a second copolymer B selected from the following

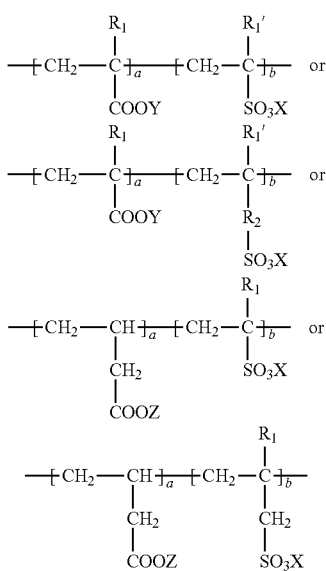

wherein $R_1$ and $R_1'$ are a hydrogen or a —$CH_3$, —$CH_2CH_3$, —$CH_2CH_2CH_3$ group and can be the same or different;

X, Y and Z are either hydrogen or $Na^+$, $Li^+$, $K^+$ and/or $NH_4^+$ and can be the same or different;

$R_2$ is a —$CH_2$—, —$CH_2CH_2$—, —$CH_2CH_2CH_2$—, or —C—$(CH_3)_2$ group or an aromatic group or an ester group (—$COOCH_2$—) or an amido group (—CONH—) to thereby provide acrylamide-alkyl sulfonic acid functionality (—CONH—$R_3$—$SO_3X$) where $R_3$ is a —$CH_2$—, —$CH_2CH_2$—, —$CH_2CH_2CH_2$—, —C—$(CH_3)_2$, or —C—$(CH_3)_2$—$CH_2$— group;

wherein the weight percent of repeat unit "a" in copolymer B is in excess to the weight percent of repeat unit "b" and repeat unit "b" is present at 15 wt. % to 40 wt. %;

wherein copolymer A indicates a binding capacity in the range of 350 mg $CaCO_3$/g copolymer A to 700 mg $CaCO_3$/g copolymer A and a calcium tolerance (turbidity at pH 11 minus turbidity at pH 6) of less than or equal to 100; and wherein copolymer B indicates a dispersant capacity as indicated by turbidity, as measured by titration of a solution of copolymer B with a calcium chloride solution at a concentration of 2.0 wt % at 10.0 ml per hours over 10 minutes of time at room temperature, wherein said turbidity at 400 seconds is in the range of 0-50 NTU.

13. The dishwashing detergent formulation of claim 12 further comprising an inorganic base.

14. The dishwashing detergent formulation of claim 13 wherein said inorganic base is present at a level of 1.0% by weight to 50.0% by weight.

15. The dishwashing detergent formulation of claim 12 including a chelant at a MW of ≤700 g/mole and present at a level of 0.1% by weight to 30.0% by weight.

16. The dishwashing detergent formulation of claim 12 further comprising a non-ionic surfactant.

17. The dishwashing detergent formulation of claim 16 wherein said non-ionic surfactant is present at a level of 0.05% by weight to 15.0% by weight.

18. The dishwashing formulation of claim 12 further comprising an enzyme.

19. The dishwashing formulation of claim 18 wherein said enzyme is present at a level of 0.05% by weight to 5.0% by weight.

20. The dishwashing formulation of claim 12 further comprising a bleaching agent.

21. The dishwashing formulation of claim 20 wherein said bleaching agent is present at a level of 0.5% by weight to 25.0% by weight.

22. The dishwashing formulation of claim 21 including manganese trimethyl-1,4,7-triazacyclononane (MnTACN) present at a level of 0.0001% by weight to 0.3% by weight.

23. The dishwashing formulation of claim 12 wherein said formulation is contained within a water soluble film.

24. The dishwashing formulation of claim 12 wherein said formulation is in the form of a tablet.

\* \* \* \* \*